United States Patent
Zhang et al.

(10) Patent No.: US 8,762,318 B2
(45) Date of Patent: Jun. 24, 2014

(54) SUPPLEMENTING A TRAINED MODEL USING INCREMENTAL DATA IN MAKING ITEM RECOMMENDATIONS

(75) Inventors: Qiong Zhang, Sunnyvale, CA (US); Wei Du, Burbank, CA (US); Wei Yu, Davis, CA (US); Biswadeep Nag, Fremont, CA (US); Jessi Dong, Saratoga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/618,647

(22) Filed: Sep. 14, 2012

(65) Prior Publication Data

US 2013/0024318 A1 Jan. 24, 2013

Related U.S. Application Data

(63) Continuation of application No. 12/533,632, filed on Jul. 31, 2009, now Pat. No. 8,326,777.

(51) Int. Cl.
*G06N 5/04* (2006.01)
*G06N 99/00* (2010.01)

(52) U.S. Cl.
CPC .............. *G06N 99/005* (2013.01); *G06N 5/045* (2013.01)
USPC ........................................................ 706/47

(58) Field of Classification Search
CPC ....................................................... G06N 5/025
USPC ................................................. 706/12; 707/5
See application file for complete search history.

*Primary Examiner* — Jeffrey A Gaffin
*Assistant Examiner* — Ola Olude Afolabi
(74) *Attorney, Agent, or Firm* — James J. DeCarlo; Greenberg Traurig, LLP

(57) ABSTRACT

Incremental training data is used to supplement a trained model to provide personalized recommendations for a user. The personalized recommendations can be made by taking into account the user's behavior, such as, without limitation, the user's short and long term web page interactions, to identify item recommendations. A trained model is generated from training data indicative of the web page interaction data collected from a plurality of users. Incremental training data indicative of other web page interaction data can be used to supplement the trained model, or in place of the trained model. Incremental training data can be indicative of user behavior collected more recently than the data used to train the model, for example.

27 Claims, 9 Drawing Sheets

200

Figure 1:
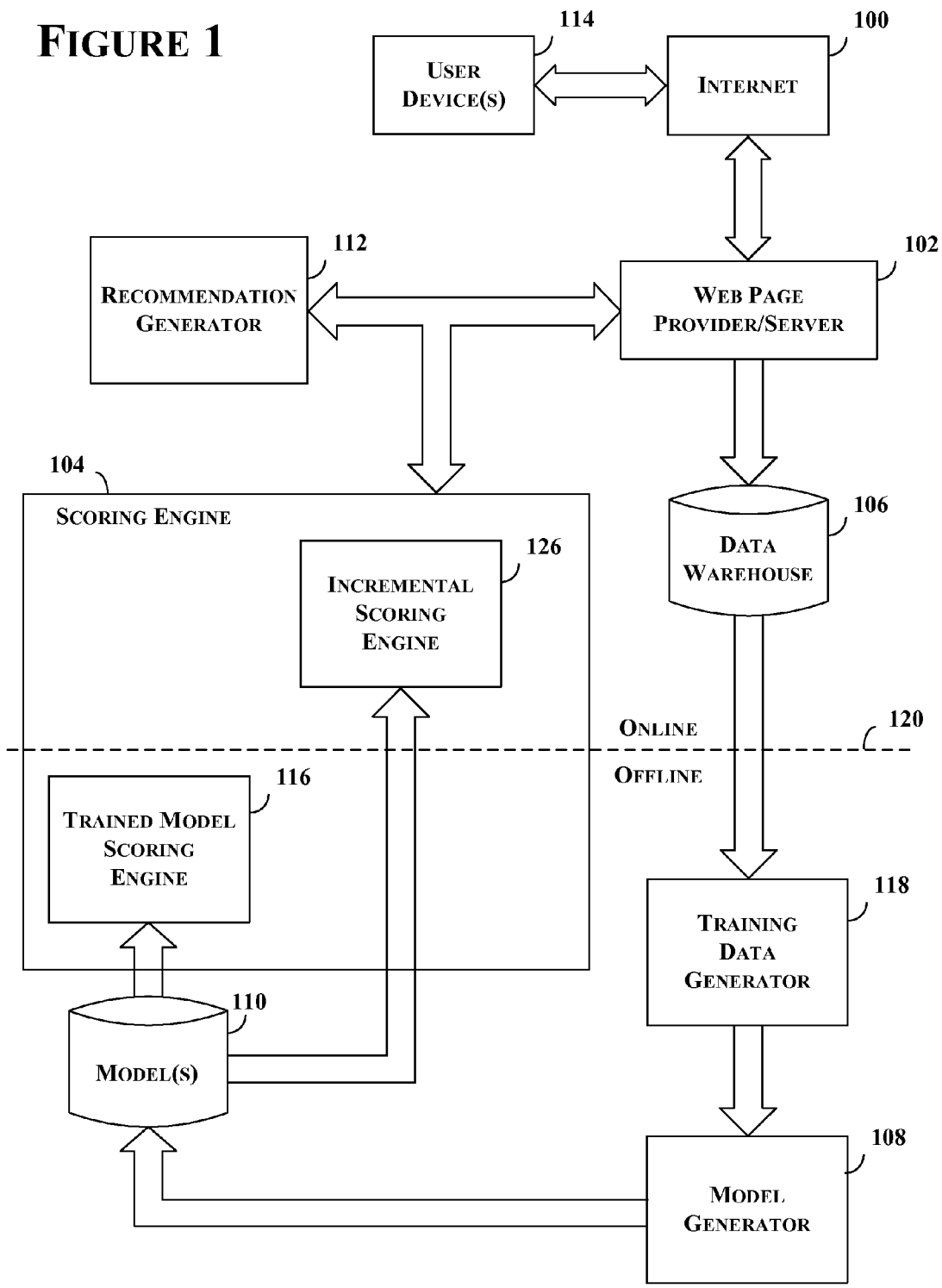

| USER | CLUSTER | PROBABILITY |
|---|---|---|
| USER 1 | CLUSTER A | 80% |
| USER 1 | CLUSTER B | 10% |
| USER 2 | CLUSTER A | 70% |
| USER 2 | CLUSTER B | 25% |

220

| USER | ITEM | NO. OF CLICKS |
|---|---|---|
| USER 1 | NEW YORK | 5 |
| USER 1 | LAS VEGAS | 3 |
| USER 2 | NEW YORK | 8 |
| USER 2 | SAN FRANCISCO | 12 |

240

| ITEM | CLUSTER | SCORE |
|---|---|---|
| NEW YORK | CLUSTER A | 9.6 = 5*80%+8*70% |
| NEW YORK | CLUSTER B | 7.0 = 5*10%+8*25% |
| LAS VEGAS | CLUSTER A | 2.4 = 3*80% |
| LAS VEGAS | CLUSTER B | 0.3 = 3*10% |
| SAN FRANCISCO | CLUSTER A | 8.4 = 12*70% |
| SAN FRANCISCO | CLUSTER B | 3.0 = 12*25% |

260

| USER | ITEM | SCORE |
|---|---|---|
| USER 1 | NEW YORK | 8.38 = 9.6*80%+7*10% |
| USER 1 | LAS VEGAS | 1.95 = 2.4*80%+0.3*10% |
| USER 1 | SAN FRANCISCO | 7.02 = 8.4*80%+3*10% |
| . . . | . . . | . . . |

FIGURE 2

SUPPLEMENTING A TRAINED MODEL USING INCREMENTAL DATA IN MAKING ITEM RECOMMENDATIONS

CROSS REFERENCE TO RELATED APPLICATIONS

This application claims the priority from co-pending U.S. patent application Ser. No. 12/533,632, filed Jul. 31, 2009, entitled SUPPLEMENTING A TRAINED MODEL USING INCREMENTAL DATA IN MAKING ITEM RECOMMENDATIONS.

FIELD OF THE DISCLOSURE

The present disclosure relates to generating personalized item recommendations, and in particular to using a temporal dimension in generating personalized item recommendations.

BACKGROUND

Web sites, many times, provide recommendations to online users. By way of one non-limiting example, a shopping site, such as Yahoo! Shopping for example, provides the user with a plurality of item recommendations in a web page provided for display in a browser operating on the user's computer. Typically, the same set of recommendations is provided to multiple users, and/or to the same user multiple times.

SUMMARY

Embodiments of the present disclosure seeks to address failings in the art and to generate personalized recommendations for a user, which take the user's behavior, such as and without limitation short and long term web page interactions by the user, into account to identify item recommendations. In accordance with one or more embodiments, a trained model is generated using user behavior, indicated in web page interaction data collected for a plurality of users, and the trained model can be used in combination with user behavior not used to generate the model, e.g., user behavior collected more recently than the data used to train the model, to select items for recommendation. Advantageously, the behavior of casual, or infrequent, users can be taken into account in making recommendations. Furthermore, advantageously, recent user behavior can be used in combination with the user behavior used to train the model to make item recommendations.

In accordance with one or more embodiments, the web page interaction data comprises data that indicates user behavior, such as a user's interaction with a web page, e.g., clicking on an item, tagging an item, searching an item, experiencing an item, etc., the model is trained using the data of a plurality of users, e.g., frequent users, and item recommendations for a given user are selected using the trained model, and in some cases incremental user behavior. In accordance with one or more embodiments, if the user is a frequent user, or is a user whose behavior is used to train the model, the incremental item scoring provides a mechanism for using additional behavior by the user to influence the personalized recommendations made for the user. In a case that a user's behavior was not used to train the model, e.g., a casual or infrequent user, embodiments of the present disclosure provide an ability to take the user's behavior into account to make personalized recommendations for the user.

In accordance with one or more embodiments, users and items can belong to one or more clusters; for each cluster, a probability of is assigned to each user, which represents the probability that the user belongs to the cluster, and a probability is assigned to each item, which represents the probability that the item belongs to the cluster. In accordance with one or more embodiments, in a case that the trained model and incremental data are used, the user and item probabilities can comprise an aggregate of two probabilities, one identified using the trained model and one identified using the incremental data. In accordance with one or more embodiments, a weight can be applied to each probability, e.g., each of the user probabilities. By way of a non-limiting example, it is possible to place greater importance, or a higher priority, on the trained model's probability relative to the incremental data's probability, or vice versa, using the probability weighting(s). By way of a further non-limiting example, weighted probabilities can be used to influence item selection performed using item scoring generated from the weighted probabilities. By way of a further non-limiting example, a weighting can be applied such that items identified using incremental data representing a user's recent web page interactions have at least some preference over items identified using the trained model. It should be apparent that weightings can be assigned to achieve other results and/or preferences as well.

In accordance with one or more embodiments, a method is provided. The method comprising generating, using at least one processor, training data from data identifying user web page interactions for a plurality of users, the training data comprising information to identify each user of the plurality and a plurality of items associated with the web page interactions of the plurality of users; training, using the at least one processor and the generated training data, a model to be used in making item recommendations; receiving an item recommendation request, the request identifying a requesting user; making, using the at least one processor, a determination whether to use short-term user behavior to make a recommendation; responsive to making a determination not to use short-term user behavior, the at least one processor using item scoring in the trained model, the item scoring identifying a plurality of scored items and the corresponding scores; responsive to making a determination to use short-term user behavior, the at least one processor: generating a short-term cluster membership vector using a current item identified from behavior of the user and the trained model, the short-term membership vector identifying a probability for each cluster identified in the trained model that the user belongs to the cluster; generating the plurality of scored items, each item having an association with at least one cluster identified in the trained model and having a cluster score corresponding to each cluster association, an item's score being determined using the item's cluster score and the probability that the user belongs for each cluster associated with the item. Items from the plurality of scored items are selected based on the item scoring; and the selected items are provided as item recommendations for the requesting user.

In accordance with one or more embodiments, a system is provided which comprises at least one server. a training data generator that generates training data from data identifying user web page interactions for a plurality of users, the training data comprising information to identify each user of the plurality and a plurality of items associated with the web page interactions of the plurality of users; a model generator that trains a model to be used in making item recommendations; a scoring engine that: receives an item recommendation request, the request identifying a requesting user; makes a determination whether to use short-term user behavior to make a recommendation; responsive to making a determination not to use short-term user behavior, uses item scoring in the trained model, the item scoring identifying a plurality of scored items and the corresponding scores; responsive to making a determination to use short-term user behavior, the scoring engine: generates a short-term cluster membership vector using a current item identified from behavior of the user and the trained model, the short-term membership vector identifying a probability for each cluster identified in the trained model that the user belongs to the cluster; generates the plurality of scored items, each item having an association with at least one cluster identified in the trained model and having a cluster score corresponding to each cluster association, an item's score being determined using the item's cluster score and the probability that the user belongs for each cluster associated with the item; and a recommendation engine that selects items from the plurality of scored items based on the item scoring, and provides the selected items as item recommendations for the requesting user.

In accordance with yet another one or more embodiments, a computer-readable medium tangibly storing thereon computer-executable process steps is provided, the process steps comprising generating training data from data identifying user web page interactions for a plurality of users, the training data comprising information to identify each user of the plurality and a plurality of items associated with the web page interactions of the plurality of users; training a model to be used in making item recommendations; receiving an item recommendation request, the request identifying a requesting user; making a determination whether to use short-term user behavior to make a recommendation; responsive to making a determination not to use short-term user behavior, using item scoring in the trained model, the item scoring identifying a plurality of scored items and the corresponding scores; responsive to making a determination to use short-term user behavior: generating a short-term cluster membership vector using a current item identified from behavior of the user and the trained model, the short-term membership vector identifying a probability for each cluster identified in the trained model that the user belongs to the cluster; generating the plurality of scored items, each item having an association with at least one cluster identified in the trained model and having a cluster score corresponding to each cluster association, an item's score being determined using the item's cluster score and the probability that the user belongs for each cluster associated with the item. The process steps further comprising selecting items from the plurality of scored items based on the item scoring; and providing the selected items as item recommendations for the requesting user.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an exemplary component overview in accordance with one or more embodiments of the present disclosure.

FIG. 2 provides an example illustrating scoring using a non-limiting data sample in accordance with one or more embodiments of the present disclosure.

Figure 3:
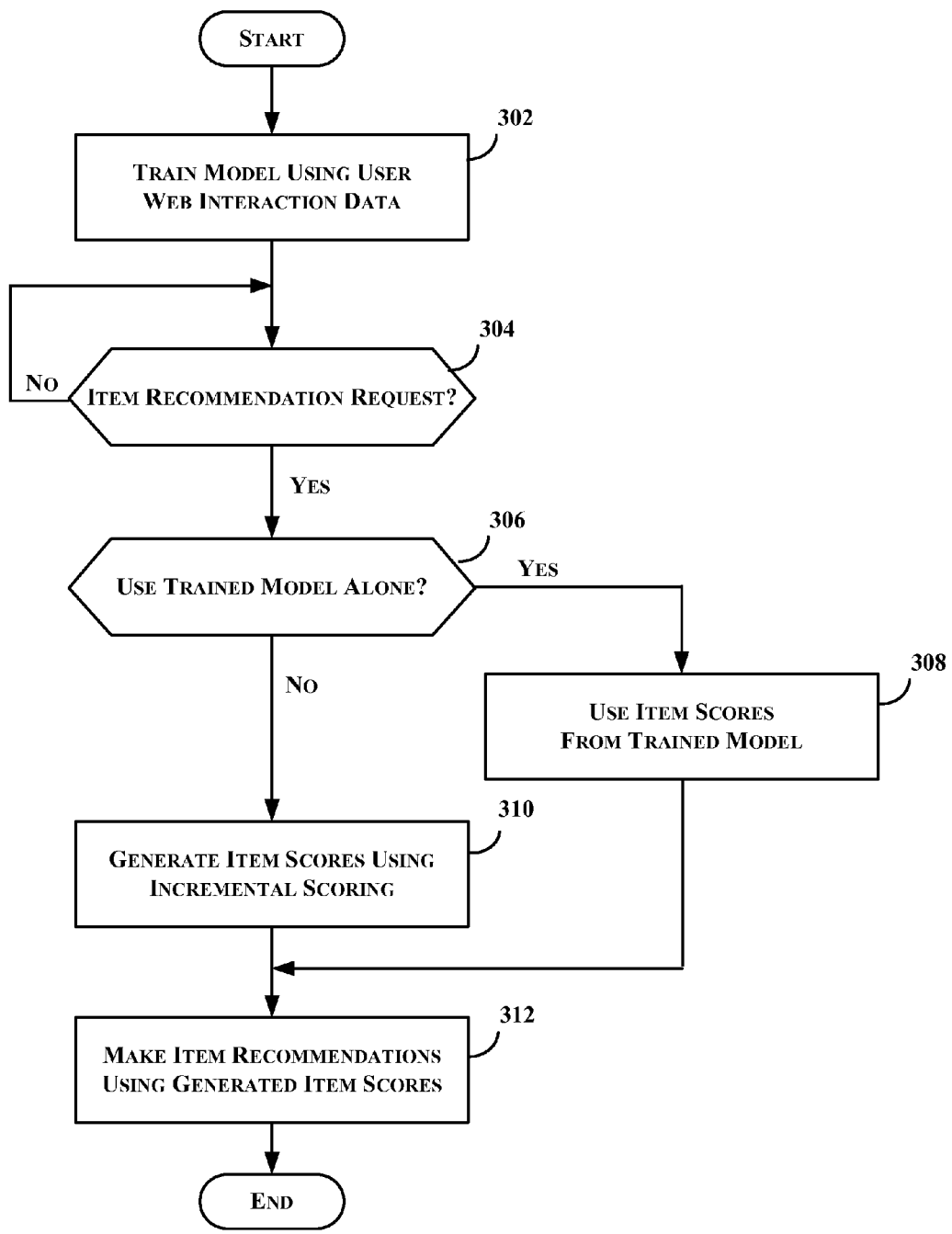

FIG. 3 provides a process overview in accordance with one or more embodiments of the present disclosure.

Figure 4:
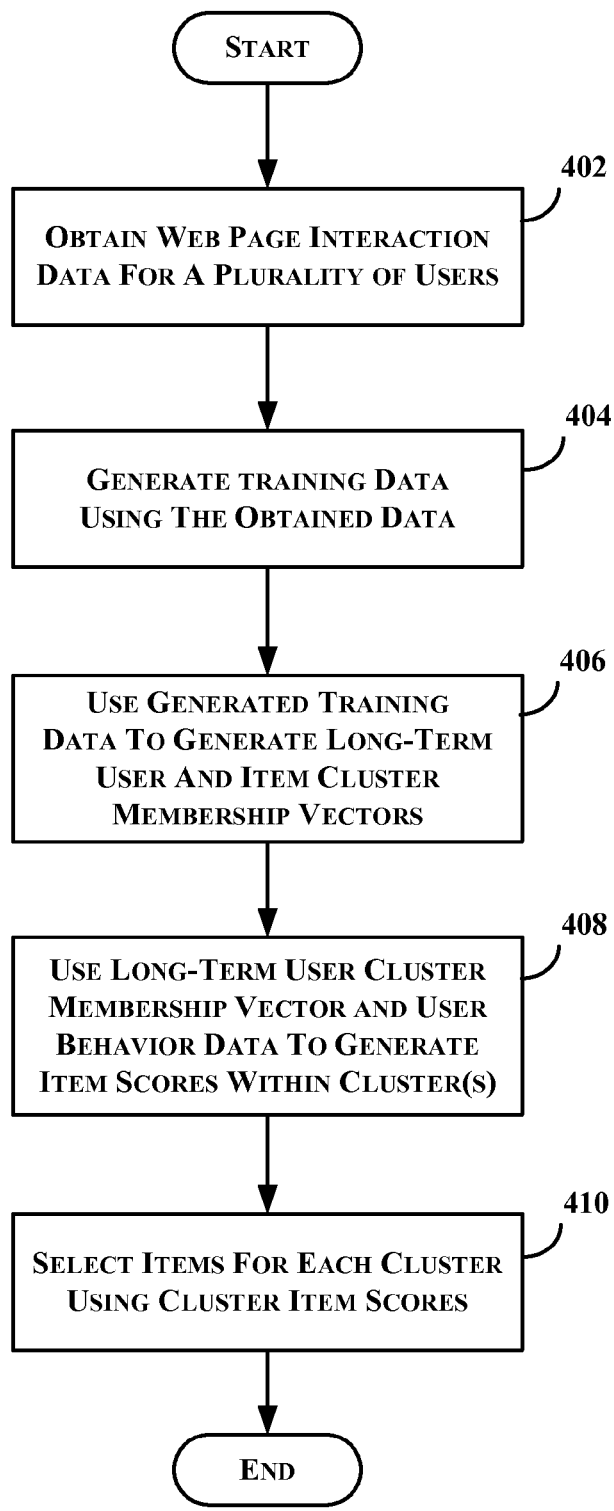

FIG. 4 provides an offline model generation and item scoring process flow used in accordance with one or more embodiments of the present disclosure.

Figure 5:
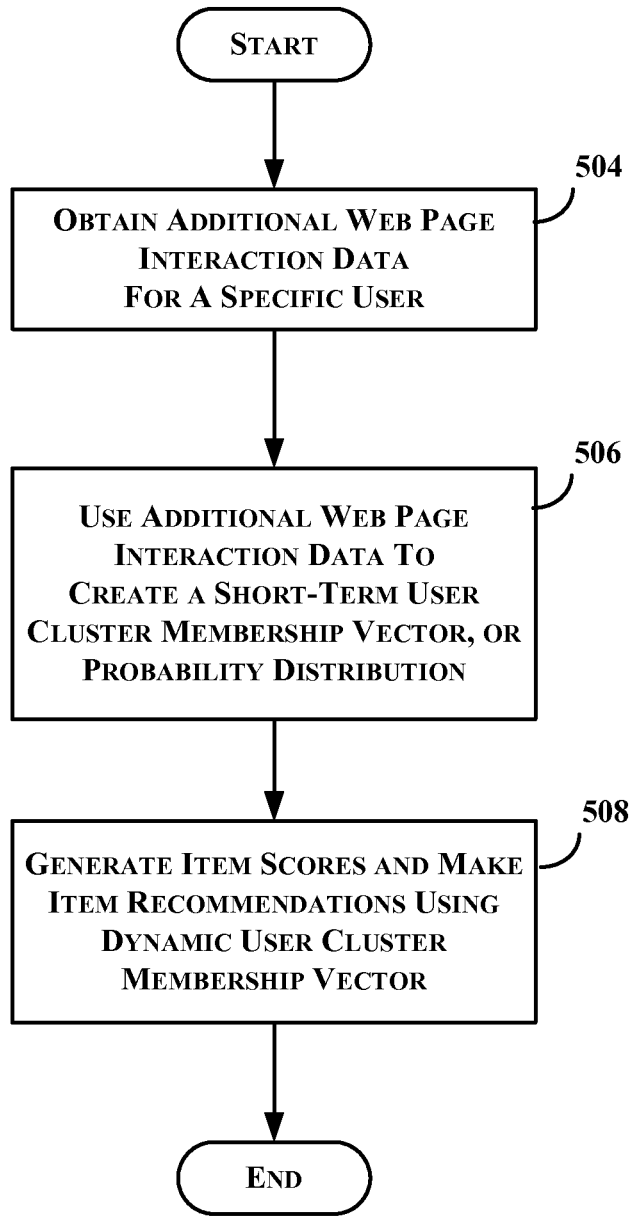

FIG. 5 provides an overview of an incremental scoring process flow used in accordance with one or more embodiments of the present disclosure.

Figure 6:
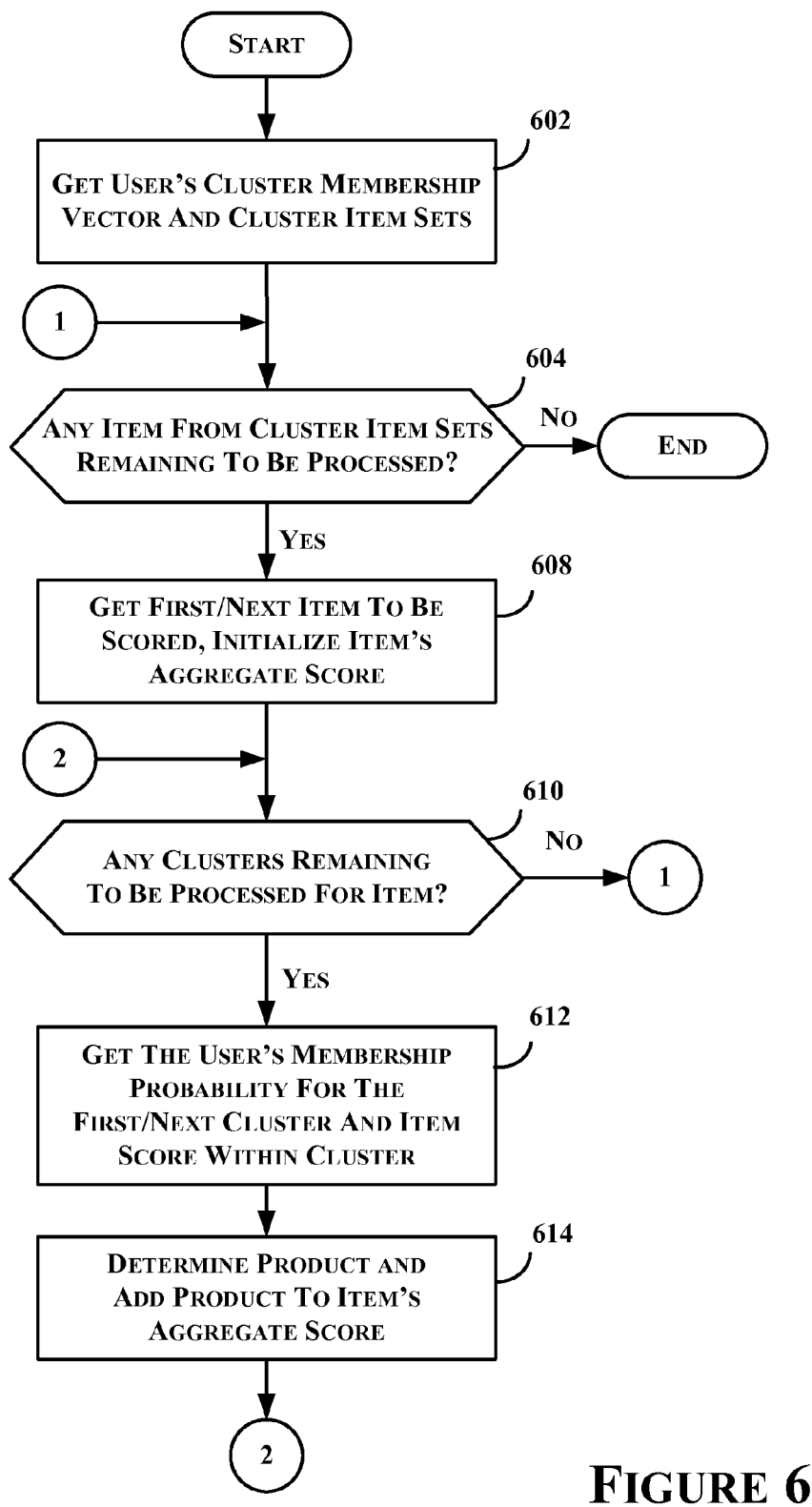

FIG. 6 provides an item scoring and selection process flow used in accordance with one or more embodiments of the present disclosure.

Figure 7:
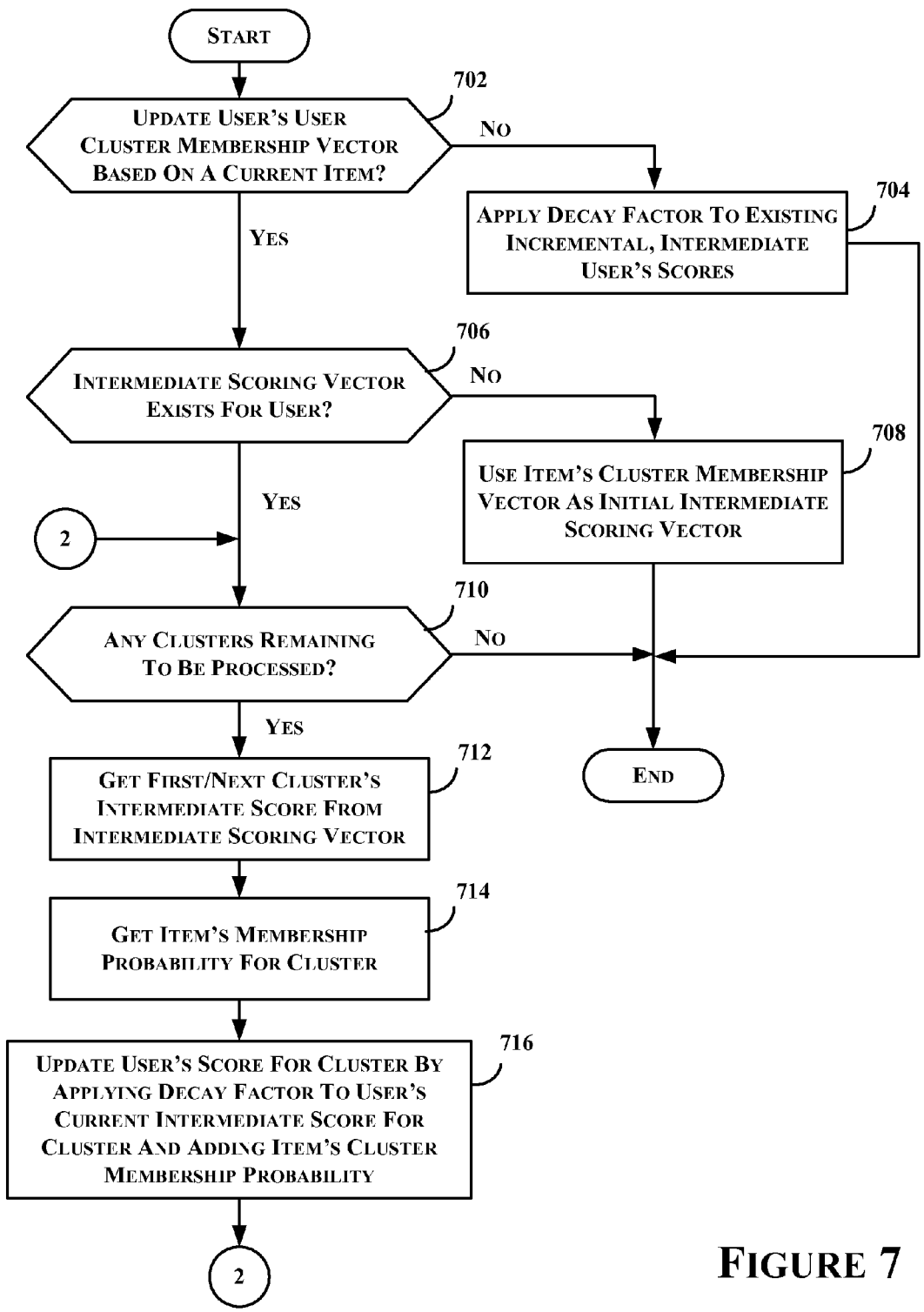

FIG. 7 provides an intermediate scoring vector generation process flow used in accordance with one or more embodiments of the present disclosure.

Figure 8:
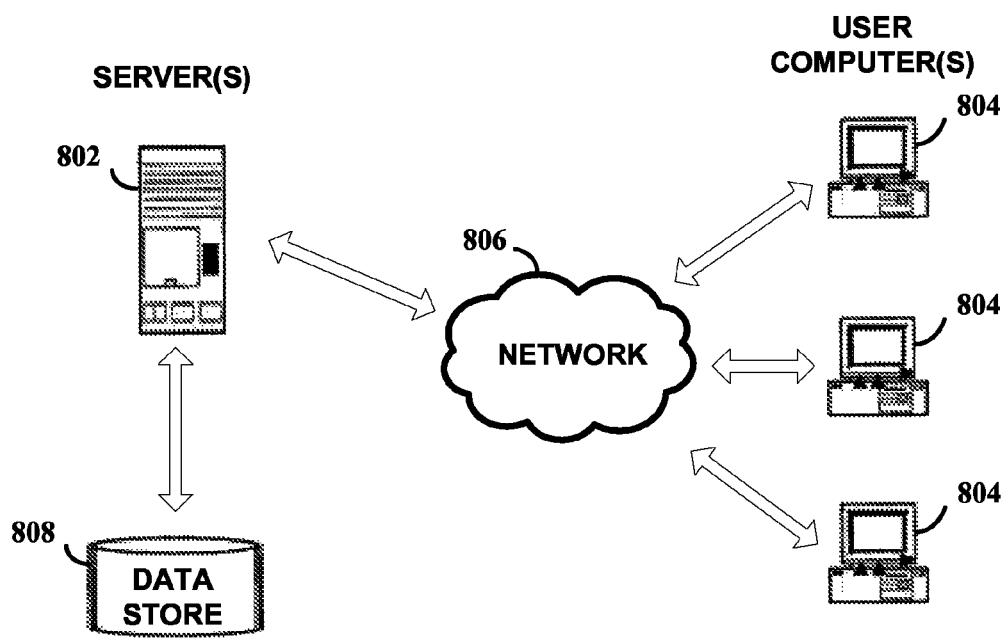

FIG. 8 illustrates some components that can be used in connection with one or more embodiments of the present disclosure.

Figure 9:
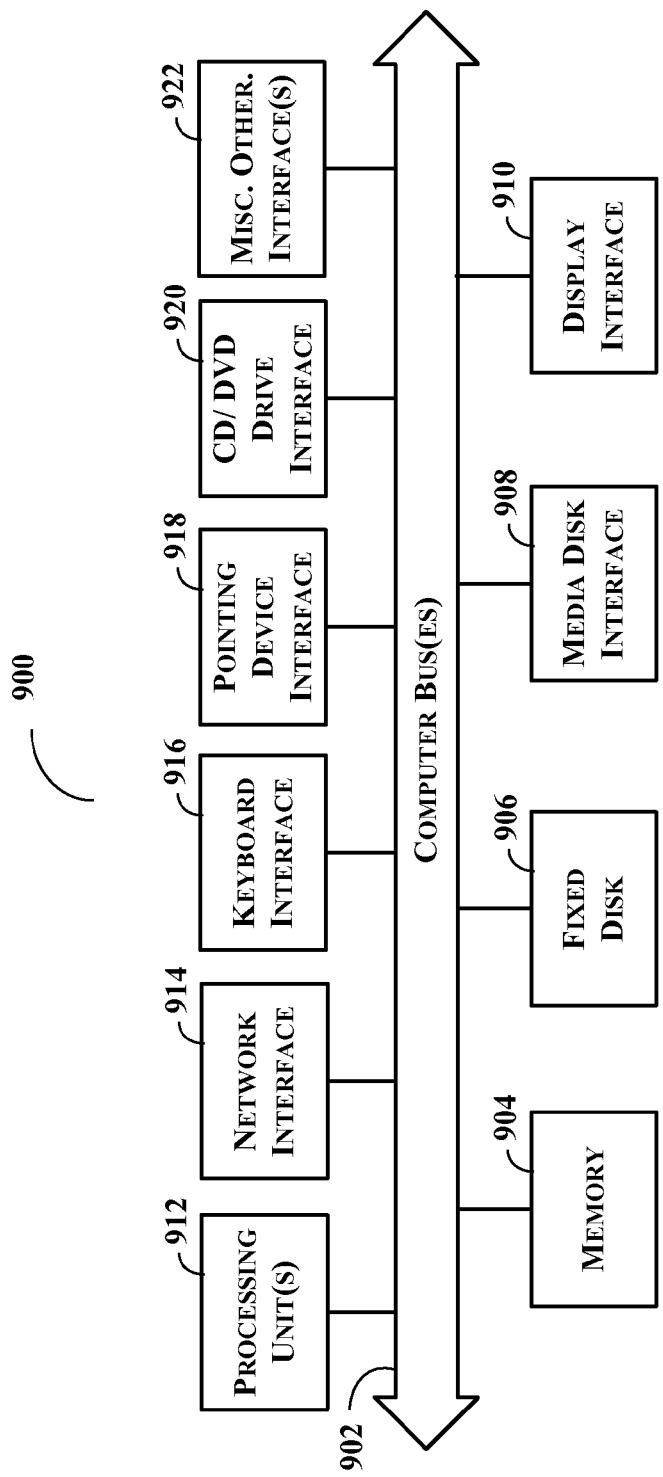

FIG. 9 provides an example of a block diagram illustrating an internal architecture of a computing device in accordance with one or more embodiments of the present disclosure.

DETAILED DESCRIPTION

In general, the present disclosure includes a system, method and architecture for supplementing a trained model using incremental data in making item recommendations.

Certain embodiments of the present disclosure will now be discussed with reference to the aforementioned figures, wherein like reference numerals refer to like components.

In accordance with at least one embodiment, personalized recommendations for a user are generated; the personalized recommendations are generated by taking into account the user's behavior in connection with one or more web pages provided by one or more servers, e.g., servers providing services of one or more service providers. User behavior in connection with one or more web pages is also referred to herein as a user's web page interaction, and data collected identifying behavior, and/or web page interaction, of one or more users is referred to herein as web page interaction data. In accordance with one or more embodiments, web page interaction data comprises a temporal component, e.g., information identifying a time, time period, or term. By way of a non-limiting example, the temporal component can be used to select web page interaction data for a certain time, time period, or term. By way of a non-limiting example, the selected web page interaction data can satisfy the given period of time if its temporal component falls in a time range identifying the time period, falls before a given time, falls after a given time, falls on a given time, etc. In accordance with one or more embodiments, a term can be short term, long term, etc. By way of a non-limiting example, a short term can reflect a period of time that is shorter than the long term, and/or can reflect a period of time that is more recent, in relative time, to the long term. In accordance with one or more embodiments, short term web page interaction data is data other than that used to train an offline model. Web page interaction data, such as, without limitation, short and long term web page interactions by the user, can be collected and taken into account to identify item recommendations.

In accordance with one or more embodiments, a trained model, also referred to herein as an offline model, is generated using web page interaction data collected from a plurality of users, and the trained model can be used in combination with user behavior not used to generate the model, e.g., short term user behavior and/or user behavior collected more recently than the data used to train the model, to select items for recommendation. Advantageously, the behavior of casual, or infrequent, users can be taken into account in making recommendations. Furthermore, advantageously, recent user behavior can be used in combination with the user behavior used to train the model to make item recommendations.

In accordance with one or more embodiments, the web page interaction data comprises user click-through data. In accordance with one or more such embodiments, the model is trained using the click-through data of a plurality of users, e.g., frequent users, and item recommendations for a given user are selected based on incremental item scoring determined using web page interaction data other than the web page interaction data used to train the model incremental, e.g., short term or recent web page interaction data, collected for the user. In accordance with one or more embodiments, the web page interaction data can comprise click through data, searches performed by users and user tagging of web page display items, multimedia content item selections, etc. It should be apparent that the examples provided are non-limiting examples of items that can be identified by web page interaction data. Embodiments disclosed herein are not limited to click-through, search and tagging, and can include any type of user behavior, including web page interaction by users.

In accordance with one or more embodiments, frequent users can be identified based on the web page interaction data associated with the user. In accordance with one or more embodiments, if the user is an infrequent user, or is a user whose web page interaction data, or user behavior, is not used to train the model, incremental scoring provides a mechanism to personalize the recommendations for the user based on the user's own user behavior, which would otherwise not be possible from the item scoring provided using the trained model. In accordance with one or more embodiments, if the user is a frequent user, or is a user whose web page interaction data, or user behavior, is used to train the model, the incremental scoring provides a mechanism for using additional web page interaction data, or additional user behavior, to influence the personalized recommendations made for the user.

In accordance with one or more embodiments, users and items can belong to one or more clusters. In accordance with one or more embodiments, a user cluster membership vector for a user comprises an entry for each cluster, the entry identifying the probability that the user belongs to the cluster. In accordance with one or more embodiments, an item cluster membership vector comprises an entry for each cluster, the entry identifying a probability that the item belongs to the cluster.

FIG. 1 provides an exemplary component overview in accordance with one or more embodiments of the present disclosure. In accordance with one or more embodiments, a user interacts with web pages provided by a web page provider's server 102 via a user device 114 and the internet 100, or any network capable of connecting user device 114 and server 102. By way of some non-limiting examples, web page provider can be an entity that serves web pages via one or more servers 102. A web page served to a user can include one or more opportunities for the user to select, tag and/or search for, items identified in the web page.

By way of a non-limiting example, a web page provided by Yahoo! Inc.'s travel property can include cities as items that can be selected by the user. The behavior of user interacting with a web page, or web pages, served by server 102 is recognized by server 102, and a record of the user's interactions can be retained, e.g., in data warehouse 106. Other examples of web pages and selectable items include, without limitation, web pages that present items for purchase or review, web pages that include opportunities to purchases tickets to concerts, movies, etc., web pages that allow the user to listen to, purchase, or search for information about, audio, video and multimedia content, web pages that allow the user to request a search, with search terms, and web pages that provide search results to the user for review and selection of items in the search results. In general, a web page can identify a one or more items, and user's behavior and interaction with the web page can be used to identify a user's interest in an item, or a relationship between the user and the item, e.g., the user's city and/or state. In accordance with one or more embodiments, a user's behavior, including without limitation, clicking on an item, clicking on a URL, or other link, referencing the item, entering the item in a text field, or otherwise selecting or identifying an item, can be used to identify a relationship between the user and the item. In accordance with one or more embodiments, web page interaction data representing the user's behavior is collected by server 102, and retained in storage, e.g., data warehouse 106.

In accordance with one or more embodiments, a model 110 is trained offline, and is used as part of an online recommendation process. Reference line 120 provides an exemplary delineation between offline and online processing in accordance with one or such embodiments. As part of the offline processing, training data generator 118 analyzes the web interaction data stored in data warehouse 106 to generate a training data set, which is used by model generator 108 to generate one or more models 110. By way of some non-limiting examples, the training data generator 118 feeds training data obtained from web interaction data covering a given period of time and a plurality of users to model generator 108. In accordance with one or more embodiments, item scoring using the trained model 110 is performed offline by trained model scoring engine 116. As is described in more detail below in connection with FIG. 2, item scores can be generated using a user cluster membership vector, e.g., a long-term user cluster membership vector of trained model 110 or a short-term cluster membership vector generated in accordance with one or more embodiments.

In accordance with one or more embodiments, other user behavior, e.g., from recent web interaction, e.g., more recent than the web interaction data used to generate the training data for the model generator 108, is used as part of the online scoring performed by incremental scoring engine 126. In accordance with one or more embodiments, the web interaction data used as part of the online processing is for a single user, e.g., the user for whom recommendations are being generated.

In accordance with one or more embodiments, the offline processing is performed independent of a recommendation request and uses user behavior for a plurality of users and a given period of time, and the online processing is performed in response to a recommendation request for a user and uses current user behavior of the requesting user. By way of a non-limiting example, the recommendation request can be made by server 102 to populate a web page that is to be transmitted to user 114 via server 102.

In accordance with one or more embodiments, in a case that a user, e.g., an infrequent user, new user, etc., is not covered by model 110, the user's web page interaction data, e.g., recent web page interaction data, is used to generate a user cluster membership vector, referred to as a short-term user cluster membership vector, in real time for the user, and the user's cluster membership vector is used to score items and make recommendations. Alternatively, in accordance with one or more embodiments, the user's cluster membership vector from model 110, referred to as a long-term user cluster membership vector, can be updated or replaced by a short-term user cluster membership vector generated using other, e.g., more recent, user behavior, or web interaction data, for the user. In accordance with one or more embodiments, a short-term user cluster membership vector is generated, as part of the online processing. In a case that the user has a cluster membership vector in the trained model 110, e.g., the long-term cluster membership vector generated offline, and a short-term cluster membership vector generated online, the long-term and short-term vectors can be combined, or aggregated, in the online processing by the incremental scoring engine 126, and the combined/aggregated cluster membership vector for the user is used to score items and make recommendations. In accordance with one or more embodiments, a weight can be applied to one or both of the long-term and short-term user cluster membership vectors as part of the aggregation. By way of a non-limiting example, the weighting can be used to place greater importance, or a higher priority, on the short-term vector, or vice versa. By way of a non-limiting example, the weighting to the short- and long-term vectors can be such that a user's recent web page interactions have a greater influence on scoring and recommendation than the user's web page interactions used to generate the offline model, of vice versa. It should be apparent that weightings can be assigned to achieve other results and/or preferences as well.

In accordance with one or more embodiments, the web page interaction data comprises information identifying the user, the items associated with the user, e.g., items clicked on by the user, number of clicks, searches, tags, etc., and a time, e.g., a "clicked on" or "clicked-through" time, for each item. In accordance with one or more embodiments, the time information can comprise some or all of month, day, year, time of data, etc.

In accordance with one or more embodiments, the training data generated by training data generator 118 includes an M×N matrix, where M is the number of users in a plurality of users whose web page interaction data is being used to generate the training data for model generator 108 to generate model 110, and N is the number of items clicked on by the users. Each cell represents an intersection of a user and an item and identifies the number of times that the user clicked on, or otherwise identified, the item. By way of a non-limiting example, the training function that is used by the model generator 108 is a Probabilistic Latent Semantic Analysis (PLSA) function. It should be apparent that other functions, including without limitation a Linear Discriminant Analysis (LDA), can be used by model generator 108 to generate model 110.

By way of a non-limiting example, model 110 identifies a plurality of clusters, a plurality of users and a plurality of items, for each cluster, the model identifies a user probability for each user of the plurality of users and an item probability for each item of the plurality of items, the user probability representing a probability that the user belongs to the cluster, and the item probability representing a probability that the item belongs to the cluster. In accordance with at least one embodiment, a number of clusters are identified. By way of a non-limiting example, a model 110 generated using a PLSA function comprises an aspect model, and the clusters correspond to aspects, or states of a latent variable, z, which has a state for every possible occurrence of user, u, and item, i, pairing, (u,i). The latent variable is used to render the user and item independent, such that:

$$P(i|u)=P(z)P(u|z)P(i|z), \text{ or}$$

the probability of item, i, given user, u, is dependent on the probability of a state of the latent variable, z, the probability of user, u, given the state, z, and the probability of item, i, given the state, z. While the latent variable, z, can have a state for each pairing of user and item, the number of states of z can be fewer than the number of pairings. In accordance with one or more embodiments, the number of different states of z can be considerably fewer than the number of user and item pairings. In accordance with one or more embodiments, each state of z that is used corresponds to a cluster.

It should be apparent that clustering of users, or items, can be performed using techniques other than PLSA, including without limitation LDA. In accordance with one or more embodiments, In accordance with one or more embodiments, for each user and cluster, model 110 identifies a probability that the user belongs to the cluster, and for each item and cluster, model 110 identifies a probability that the item belongs to the cluster. By way of a non-limiting example, for a user, u, there is a probability associated with each cluster in the set of clusters, C, that the user belongs to the cluster, which can be expressed in the form of a vector, as follows:

$$P(C|u)=<p(c_1|u),p(c_2|u),\ldots,p(c_k|u)>,$$

for each cluster, $c_1$ to $c_k$, where k represents the number of clusters. By way of a further non-limiting example, for an item, i, there is a probability associated with each cluster in the set of clusters, C, that the item belongs to the cluster, which can be expressed in the form of a vector, as follows:

$$P(C|i)=<<p(c_1|i),p(c_2|i),\ldots,p(c_k|i)>,$$

for each cluster, $c_1$ to $c_k$. In accordance with at least one embodiment, the probability, p, is non-negative, and the sum of the value of probability, P, is one, such that the sum of the values of all of the probabilities, p, in the vector is equal to one. In accordance with one or more embodiments, a user, or item, can belong to multiple clusters, and there is a known probability for each user and cluster pair and each item and cluster pair in the model, which identifies the probability to which the user, or item, belongs to the cluster.

By way of a non-limiting example, the following user and item cluster membership vectors identifies user and item probabilities for a number of clusters, k, where k is equal to 5:

P(C|u)=(0.0, 0.9, 0.0, 0.1, 0.0), where each value corresponds to a cluster and represents a probability that the user, u, belongs to the cluster, and P(C|i)=(0.6, 0.3, 0.1, 0.0, 0.0), where each value corresponds to a cluster and represents a probability that the item, i, belongs to the cluster. In the example, the uppercase C is used to represent the set of clusters, and the lowercase u and i represent one user and item. Unless otherwise indicated, uppercase variables represent a set, and lowercase variables represent a member of the set.

Given the example, the probabilities that the user, u, belongs to the $2^{nd}$ and $4^{th}$ clusters are 0.9 and 0.1, respectively, and that there is zero probability that user, u, belongs to the $1^{st}$, $3^{rd}$ and $5^{th}$ clusters. In the example, the probabilities that item, i, belongs to the $1^{st}$, $2^{nd}$ and $3^{rd}$ clusters are 0.6, 0.3 and 0.1, respectively, and that item, i, belongs to the $4^{th}$ and $5^{th}$ clusters with a zero probability.

Referring again to FIG. 1, scoring engine 104 scores items, and provides the item scores to recommendation generator 112. In accordance with one or more embodiments, the scoring engine scores items in response to a request received from server 102, or recommendation generator 112 in a case that server forwards the recommendation request to recommendation generator 112 instead of forwarding it directly to scoring engine 104. The request received by scoring engine 104 includes information identifying the user for whom an item recommendation is to be made, and optionally a current item, e.g., a clicked-on item.

In accordance with one or more such embodiments, scoring engine 104 includes a trained model scoring engine 116, which scores items offline using the long-term user cluster membership vector from model 110, and incremental scoring engine 126, which generates a short-term user cluster membership vector and scores items using the short-term vector alone or in combination with the long-term vector from model 110 to score items online. In accordance with one or more embodiments, as is described in more detail below, the incremental scoring engine 126 uses an item identified in the request received request and the item cluster membership vector of model 110 to generate the short-term user cluster membership vector.

In accordance with one or more embodiments, recommendation generator 112 selects a number of the items as item recommendations, which are forwarded to server 102. In accordance with one or more embodiments, the item recommendations can be included in a web page, which is forwarded to server 102. Alternatively, the item recommendations can be forwarded to server 102, and server 102 can use functionality to include the item recommendations in a web page. The web page that includes the item recommendations can be served to a user by server 102 via internet 100 and user device 114, for example.

In accordance with one or more embodiments, server 102 can implement a further filter to select a subset of the item recommendations provided by recommendation generator 112. The number of item recommendations selected by recommendation generator 112 and/or server 102 can be based on available space in the web page in which the items are to be included, for example. It should be apparent that any criteria can be used to determine the number of item recommendations.

In accordance with one or more embodiments, item recommendations for a user, u, can be selected using the scores generated for a plurality of items. In accordance with one or more embodiments, a score can be computed for all of the items, I, in model 110. In accordance with one or more embodiments, as is discussed below, items scored to determine recommendations can be a subset of the items, I, in the model 110. In accordance with one or more such embodiments, the subset of items includes items selected for each cluster, e.g., the items having the highest scores within a cluster are selected for the cluster. By way of a non-limiting example, for a given cluster, a score for each item, i, in the cluster can be determined to be the aggregate score for each user belonging to the cluster, e.g., having a probability greater than zero, with each user, item score being determined based on the number of clicks on the item by the user, u, and the probability, p(c|u), that the user belongs to the cluster, c. For each cluster, some number, e.g., 10 or 20, of the items having the highest scores are selected. In accordance with one or more embodiments, items can be selected from I for each cluster, and all of the items selected from I for the clusters can be scored to determine recommendations.

FIG. 2 provides an example illustrating scoring using a non-limiting data sample in accordance with one or more embodiments of the present disclosure. The example of FIG. 2 includes two users, i.e., User1 and User2, and three items, i.e., New York, Las Vegas and San Francisco, and two clusters, Cluster A and Cluster B. The example can be that of a travel web page, and the cities are examples of items that were clicked on, e.g., entered, selected, etc., via one or more web pages related to travel served by server 102.

Table 200 provides a tabular representation of contents of a user cluster membership vector, or portion thereof, for User1 and User2. Each row in table 200 corresponds to a user, cluster pairing and identifies the probability that the user belongs to the cluster. In the example of table 200, User1 has an 80%, or 0.8, probability of belonging to Cluster A, for example. In accordance with one or more embodiments, model 110 identifies the clusters and the users represented by the model, and the long-term user cluster membership probabilities, each probability representing a likelihood that a user belongs to a given cluster. As discussed herein, in accordance with one or more embodiments, model 110 is generated by model generator 108 in an offline process using a model generating function such as PLSA. In accordance with one or more embodiments, the user cluster membership vector shown represented in table 200 can be a long-term or a short-term user cluster membership vector.

Each row in table 220 corresponds to a user and item pairing and identifiers the number of times the user clicked on the item. For example, the third row in table 220 indicates that User2 clicked on the New York item 8 times, as identified from the web page interaction data. Table 220 provides an example of user behavior that can be used to train model 110, for example.

Table 240 provides an example of data that can be included in model 110 in accordance with one or more embodiments of the present disclosure. Each row in table 240 corresponds to an item, cluster pairing and identifies an item's score within the cluster. Each row in Table 240 identifies an item's score within a cluster. The first row identifies the score for the item New York within Cluster A, or 9.6. As is shown in table 240, the item's score is an aggregate of products, each product multiplies a user's probability of belonging to the cluster and the number of times the user selected the item. As is indicated in the first row of table 240, the score of the item New York within Cluster A is the aggregate of the product of User 1's probability of belonging to Cluster A and the number of times User 1 clicked on, or selected, New York, and the product of User 2's probability of belonging to Cluster A and the number of times User 2 selected New York. Table 240 provides other examples of item scores within clusters, i.e., New York, Cluster B; Las Vegas, Cluster A, etc.

Table 260 provides an example of item scoring generating in accordance with one or more embodiments. In accordance with one or more embodiments, the item scoring can be performed offline by trained model scoring engine 116, or online by incremental scoring engine 126. Each row in table 260 corresponds to a user and item pair and identifies a score for the item in the pair, which is determined based on the item's scores determined within the clusters and the user's probability of belonging to the clusters. As shown in table 260, scores generated for the item within the clusters can be used to generate items scores for a user, e.g., a user for whom recommendations are to be made. For the sake of illustration, for user User 1 and the item New York has item scores within clusters Cluster A and Cluster B of 9.6 and 7, respectively, a score for the item across all of the clusters is determined to be a sum of the product of user User 1's probability of belonging to Cluster A and the score for item New York within cluster Cluster A and the product of user User 1's probability of belonging to Cluster B and the item New York score within cluster Cluster B. The second and third rows in table 260 provide examples of other items and their scores across the clusters, items scores across the clusters for items Las Vegas and San Francisco. Although not shown in table 260, similar calculations can be performed to generate a score for the items relative to other users, e.g., User 2. Item scoring according to one or more embodiments is described in more detail herein in connection with FIG. 6.

In accordance with one or more embodiments, the scores for item within a cluster, e.g., the scores shown in table 240, can be used to select a set of items for the cluster, which are then scored and the scores are used to select items for recommendation. Alternatively, all of the items identified in model 110 can be scored and the scores used to select items for recommendation. In accordance with one or more embodiments, items, e.g., the highest scoring, are selected for each cluster as part of the trained model 110. In accordance with one or more embodiments, the users used to train model 110 can be a subset of the users identified by the web page interaction data. In accordance with one or more embodiments, the users selected for the subset can be those users determined to be frequent users based on the, for example and without limitation, the number of items clicked, as determined by the web page interaction data being used to train model 110.

In accordance with one or more embodiments, the number of item clicks by a user can be a raw value, or a normalized value. By way of a non-limiting example, an item's normalized value can be a percentage of all of the user's item clicks. By way of a further non-limiting example, the following provides a click history for two users, User 1 and User 2, and five items:

User 1 clicks per item: [2, 1, 1, 3, 3]
User 2 clicks per item: [4, 2, 2, 6, 6]

Each user's raw click data can be normalized, with the number of clicks for each item being converted to a percentage of the total number of clicks, and the sum of the percentages being equal to one hundred. By way of a further non-limiting example, in the case of the above example, the normalized click values are:

User 1 normalized clicks per item: [20, 10, 10, 30, 30)
User 2 normalized clicks per item: [20, 10, 10, 30, 30]

With reference to FIG. 2, the item scoring shown in table 260 is provided by scoring engine 104, and is used to make item recommendations. As described herein, the item scoring can use a long-term user cluster membership vector, a short-term user cluster membership vector, or an aggregate of the long- and short-term vectors. By way of a non-limiting example, in a case that scoring is based on the long-term user cluster membership vector alone, trained model scoring engine 116 scores items for scoring engine 104. By way of a further non-limiting example, in a case that the item scoring is based on the short-term user cluster membership vector alone or in combination with the long-term vector, incremental scoring engine 126 provides the item scoring for scoring engine 104. Trained model scoring engine 116 uses model 110 generated by model generator 108 using training data provided by training data generator 118 from user behavior data stored in data warehouse 106. Incremental scoring engine 126 uses a received request that includes information identifying a user and an optionally an item. In accordance with one or more embodiments, as discussed below, incremental scoring engine 126 uses the P(C|I) vector of model 110 to generate a short-term user cluster membership vector, $P_t(C|u)$ at time, t, for a user u, e.g., a user for whom recommendations are being generated. The short-term vector, NCI u), comprises a probability, for each cluster, that the user, u, belongs to the cluster.

In accordance with one or more embodiments, the user behavior, or web page interaction data, used by incremental scoring engine 126 is not the same as the user behavior, or web page interaction data, used to train model 110 used by trained model scoring engine 116. In accordance with one or more such embodiments, the web page interaction data used by incremental scoring engine 126 is more recent than the web page interaction data used to train model 110, and may correspond to a user that is not represented in the training data used to train model 110. By way of a non-limiting example, in the latter case, an unrepresented user can be an infrequent user and the training data used to train model 110 can be limited to frequent users.

In a case that model 110 excludes infrequent, or casual, users' web interactions, such users are not included in the pre-determined probability vectors, P(C|U) and P(C|I), of model 110. An occasion to generate item recommendations for an infrequent user using model 110 may not arise, in which case, including the user in the training data and training model 110 would result in the needless expenditure of resources, e.g., processing and storage resources. The percentage of infrequent users can be rather high, e.g., 90% of the total user population. It is therefore beneficial to be able to generate a short-term user cluster membership vector indicative of the infrequent user's cluster membership, e.g., probabilities that the user belongs to the model 110 clusters, in an efficient manner.

In accordance with one or more embodiments, incremental scoring engine 126 generates a short-term vector, $P_t(C|u)$, for a user, u, at a time, t, from incremental, or intermediate, user scores generated using P(C|I) of model 110. By way of a non-limiting example, assuming a user, u, clicks on items in a sequence expressed as $(i_1, t_1), (i_2, t_2), \ldots, (i_n, t_n)$, and each one is used to generate a recommendation using incremental scoring in response, incremental, or intermediate, cluster scores can be generated for each recommendation. The following vector, S, represents the user's intermediate scores for clusters, C, at time $t_n$, can expressed as follows:

$$S(u, t_n) = \sum_x P(C|i_x) * \delta^{(t_n - t_x)} = \langle s_1, s_2, \Lambda, s_k \rangle,$$

where $\delta$ is a decay factor based on time, x is an index such that $i_x$ identifies a given one of the items, e.g., $i_1, i_2, \ldots, i_n$, and $P(C|i_x)$ is a cluster membership vector for the item, $i_x$, from model 110, e.g., a probability distribution of item $i_x$ for all of the clusters, C, e.g., clusters $c_1$ to $c_k$, and $s_1, s_2, \ldots, s_k$ represents the user's intermediate, or incremental, cluster score for each cluster at a given time, t. By way of a non-limiting example, an initial intermediate user scores vector, $S(u, t_1)$, at time $t_1$, for user, u, can be expressed as:

$$S(u, t_1) = P(C|i_1) = \langle p(c_1|i_i), p(c_2|i_1), \Lambda, p(c_k|i_1) \rangle,$$

where k is equal to the number of clusters. By way of a further non-limiting example, assuming that the next recommendation request corresponds to the next item in the above sequence, $(i_2, t_2)$, the initial intermediate user score vector, $S(u, t_1)$, can be updated using the item cluster membership vector, $P(C|i_2)$ from model 110 for item, $i_2$. The updated intermediate user score vector, $S(u, t_2)$ can be expressed as:

$$S(u, t_2) = S(u, t_1) * \delta^{(t_2 - t_1)} + P(C|i_2) = P(C|i_1) * \delta^{(t_2 - t_1)} + P(C|i_2)$$

where $\delta$ is a temporal decay factor, e.g., a value such as 0.998, which can be used to regulate the impact that a previous intermediate user scoring vector has on the current intermediate user scoring vector. By way of a yet another non-limiting example, assuming that the next recommendation request corresponds to the next item in the above sequence, $(i_3, t_3)$, $S(u,t_2)$, can be updated using the item cluster membership vector, $P(C|i_3)$ from model 110 for item, $i_3$. The updated intermediate user scores vector, $S(u,t_3)$ can be expressed as:

$$S(u,t_3)=S(u,t_2)*\delta^{(t_3-t_2)}+P(C|i_3), \text{ which is equivalent to:}$$

$$S(u,t_3)=P(C|i_1)*\delta^{(t_3-t_1)}+P(C|i_2)*\delta^{(t_3-t_2)}+P(C|i_3)$$

In accordance with one or more embodiments, the scoring can be performed using the following incremental approach for a new event (I', t') for the user:

$$S(u,t')=S(U,t_n)*\delta^{t'-t_n}+P(C|I')=\langle s'_1, s'_2, \Lambda, s'_k \rangle,$$

By incrementally updating the intermediate user scores vector, it is possible to keep, e.g., in a local or distributed cache, one intermediate user score vector for a user, and avoid a need to access previous user behavior data. By way of a non-limiting example, at time $t_3$, there is no need to recalculate the intermediate user scores for items $i_1$ and $i_2$. The incremental, intermediate user score vector can be updated each time a new request is received for the user. In accordance with one or more embodiments, an initial, or updated, user score vector can be normalized to get the short-term cluster membership vector, at time, t, for a user, which can be expressed as:

$$P_t(C|u)=S(u,t)/\Sigma_j s_j,$$

where $P_t(C|u)$ is a short-term user cluster membership vector for user, u, which indicates, for each cluster, $c_j$, of clusters, C, the probability that the user, u, belongs to the cluster, $c_j$. In accordance with at least one embodiment, the denominator provides a normalization, so that the sum of the probabilities for the user, u, across the clusters, C, equals 1. In accordance with one or more embodiments, the short-term user cluster membership vector, $P_t(C|u)$, determined for a user, u, can be used to score items and make item recommendations for the user. In so doing, the recommendations can be made by taking into account user behavior not reflected in the model 110, e.g., recent behavior by the user.

In accordance with one or more embodiments, the scoring and ranking of items for recommendation can be: 1) based on an offline-trained long-term user cluster membership vector from model 110, i.e., to the exclusion of a short-term user cluster membership vector; 2) based on a current short-term user cluster membership vector generated by incremental scoring engine 126, i.e., to the exclusion of a long-term user cluster membership vector; or 3) based on both an offline-trained long-term user cluster membership vector and a short-term user cluster membership vector. In the first case, item scores are prepared offline by trained model scoring engine 116, e.g., using model 110, and the item scores are provided by recommendation generator 112 in response to a recommendation request. The second and third cases, items scores are generated online in response to a recommendation request, and scoring engine 104 provides the item scores in response to the recommendation request.

In accordance with one or more embodiments, in the third case, incremental scoring engine 126 can generate item scores by combining short- and long-term user cluster membership vectors. Training model 110 includes a user cluster membership vector P(C|u) for a user u, e.g., a frequent user, or other user whose web page interactions are reflected in model 110. In accordance with one or more embodiments, model 110 is trained offline, and does not include more recent, or real time, web page interactions for the user, u. As such, the user cluster membership vector of model 110 can be a long-term behavior model for the user. In accordance with one or more embodiments, one or more other user cluster membership vectors can be derived for the user in the same way as the casual, or infrequent, user described above, using the latest, or more recent, activities not included in the offline training of model 110. The short-term user cluster membership vector, $P_t(C|u)$ can be derived, which represents a dynamic, changing, behavior model, for the user. In accordance with one or more embodiments, a combined cluster membership vector for the user, u, at a given time t is the weighted sum of those two vectors, which can be expresses in a non-limiting way as:

$$P_t(C|u)=\alpha \times P(C|u)+\beta \times P_t(C|u),$$

where $\alpha$ and $\beta$ are the weights and the sum of $\alpha$ and $\beta$ values equal one. The values of the weights can be used to weight the probability distribution from the model 110 higher or lower than the short term probability distribution, $P_t(I|u)$. Alternatively, the weights can be eliminated by setting $\alpha$ and $\beta$ both equal to one.

In accordance with one or more embodiments, long-term user cluster membership vector, P(C|u), or short-term user cluster membership vector, $P_t(C|u)$, or a combination of the two vectors, is used to generate item scores by scoring engine 104. Referring to FIG. 2, table 200 can be a long-term user cluster membership vector, a short-term user cluster membership vector, or a combination of long-term and short-term user cluster membership vectors. Tables 220 and 240 are generated as part of the offline processing. In accordance with one or more embodiments, with respect to cases 1-3 above, table 260 is generated: 1) offline using user cluster membership probabilities from the long-term user cluster membership vector of model 110 and item scores calculated within clusters offline; 2) online using user cluster membership probabilities from a short-term user cluster membership vector determined by incremental scoring engine 126 and item scores calculated within clusters offline; and 3) online using user cluster membership probabilities from a combination of the long-term user cluster membership vector of model 110 and a short-term user cluster membership vector determined by incremental scoring engine 126 and item scores calculated within clusters offline.

In accordance with one or more embodiments, the items that are scored can be a subset of the items identified in model 110. In accordance with one or more such embodiments, items are selected for each cluster based on scores generated for items using the cluster's user probabilities, e.g., based on item scores within clusters such as that shown in table 240 of FIG. 2. In accordance with one or more embodiments, an item's score relative to, or within, a cluster, which is also referred to herein as the item's cluster-item score, can be included in model 110. Each row in table 240 of FIG. 2, for example, provides a cluster-item score of an item determined based on users' probabilities of belonging to the cluster and the users' number of clicks of the item. In accordance with one or more embodiments, an item's score within a cluster is the sum of products, each product is determined from a user's probability of belonging to the cluster and the number of clicks of the item by the user. In accordance with one or more embodiments, a user's probability of belonging to a cluster is obtained from the long-term user cluster membership vector of model 110. In accordance with one or more embodiments, for each cluster, a number, e.g., 10 or 20, of items are selected using the scores of items within the cluster. The generated item scores can be used to rank the items, and/or to select some or all of the items to item recommendations, as identified by recommendation generator 112.

In accordance with one or more embodiments, incremental data relates to a single user. In accordance with one or more alternate embodiments, incremental data can be for more than one user.

FIG. 3 provides a process overview in accordance with one or more embodiments of the present disclosure. At step 302, model 110 is trained, e.g., by model generator 108, using web interaction data of a plurality of users. At step 304, a determination is made whether or not an item recommendation request 304 is received, e.g., received by recommendation generator 112 from server 102. If so, processing continues at step 306 to determine whether to use trained model 110 alone for item scores. By way of a non-limiting example, the determination can be made based on the user, e.g., whether or not the user is a frequent user; the determination can be made by scoring engine 104, and can be based on whether the model 110 includes the user and/or whether more recent web page interaction data is available for the user. If it is determined that only the trained model 110 is to be used, processing continues at step 308 to use item scores from trained model 110. If it is determined that item scores are to be based on incremental scoring, processing continues at step 310 to generate items score using incremental scoring. As discussed herein, incremental scoring can include item scores generated using the user's long-term user cluster membership vector in the trained model 110 in combination with a short-term user cluster membership vector for the user, or the incremental scoring can be based on a short-term user cluster membership vector for the user. In either case, processing continues at step 312 to make item recommendations using item scores from step 308 or step 310.

FIG. 4 provides an offline model generation and item scoring process flow used in accordance with one or more embodiments of the present disclosure. At step 402, web page interaction data, or user behavior data, is obtained for a plurality of users. In accordance with one or more embodiments, the web page interaction data can be obtained from data warehouse 106 by training data generator 118. Table 220 of FIG. 2 provides an example of web page interaction data that can be retrieved from data warehouse 106. At step 404, the obtained data is used, e.g., by training data generator 118, to generate training data. An item can correspond to an item clicked on by the user, an item search by the user, e.g., a key word searched, a tagged item, a multimedia selection, etc. In accordance with one or more embodiments, a filter removes infrequent, or casual, users. By way of a non-limiting example, a frequent user can be a user that visits a property, or service, of the web page provider/server 102 more than ten times during the last week. It should be apparent that a frequent user can be defined using any criteria and/or time period without departing from the scope of the present disclosure.

At step 406, the training data generated at step 404 is used to generate trained model 110. As discussed above, a two-dimensional matrix, e.g., a user dimension and an item dimension, can be input to a model generation function, such as PLSA, to generate model 110. By way of a non-limiting example, model generator 108 uses the training data provided by training data generator 118 to generate trained model 110, which comprises the long-term user and item cluster membership vectors described herein.

At step 408, the long-term user cluster membership vector and user behavior data from step 404, e.g., user cluster membership data such as that shown in table 200 and user item selection data such as that in table 220, are used to generate scores for items per cluster. At step 410, items are selected for each cluster using the scores generated for items for the cluster.

FIG. 5 provides an overview of an incremental scoring process flow used in accordance with one or more embodiments of the present disclosure. In accordance with one or more embodiments, the process flow is executed in response to a request for item recommendations, which recommendations are to be made for a user using current user behavior from web page interaction(s) other than the user behavior used to train model 110. In accordance with one or more embodiments and as described herein, in a case that the current user behavior data includes an item, the item is used together with the item's item cluster membership vector from model 110 to initialize or update an incremental, intermediate scoring vector for the user, and a normalized incremental, intermediate scoring vector for the user is used as a short-term user cluster membership vector. In accordance with one or more embodiments, the short-term user cluster membership vector can be used alone or it can be combined with the user's long-term user cluster membership vector, as described herein. At step 508, the user's short-term user cluster membership vector from step 506 is used to generate item scores and make item recommendations.

FIG. 6 provides an item scoring and selection process flow used in accordance with one or more embodiments of the present disclosure. By way of a non-limiting example, the process flow of FIG. 6 can be performed by scoring engine 104, e.g., offline by trained model scoring engine 116 or online by incremental scoring engine 126, to generate the scores shown in table 260 of FIG. 2 using the data from tables 200 and 240. In accordance with one or more embodiments, table 200 represents the long-term user cluster membership vector or a short-term user cluster membership vector. By way of a further non-limiting example, aggregate item scores, such as those shown in table 260, are provided to recommendation generator 112 to select items using each item's aggregate score as recommended items to be forwarded to server 102 the user.

At step 602, a user cluster membership vector, e.g., a short-term user cluster membership vector determined as described in connection with one or more embodiments herein, or a long-term user cluster membership vector from model 110, is obtained. At step 604, a determination is made whether or not any of the items identified for the clusters remain to be processed. If not, processing ends. If there are items remaining to be scored, processing continues at step 608 to get the first/next item to be scored, and the item's aggregate score is initialized. At step 610 a determination is made whether or not any clusters remain to be processed to generate a score. By way of a non-limiting example, each cluster that has a non-zero user cluster membership can be processed to generate an aggregate score for the item. If not, processing continues at step 604 to processing any remaining items to be scored. If there are clusters that remain to be processed in scoring an item, processing continues at step 612, to get the user's membership probability for the first/next cluster from the user cluster membership vector and the item's score within the cluster, and the product of the probability and the item's cluster score are determined at step 614. At step 614, the product is added to the item's aggregate score. Processing continues at step 610 to process any remaining clusters.

FIG. 7 provides an intermediate scoring vector generation process flow used in accordance with one or more embodiments of the present disclosure. In accordance with one or more embodiments, a current item need not be identified with a recommendation request. In such a case, the intermediate user's scores vector can be updated by applying the decay factor to the vector. In a case that an item is identified in a recommendation request, as discussed above in connection with one or more embodiments, the item's cluster membership vector is used to initialized, if a scores vector does exist, or, if a scores vector exists, update the intermediate user's scores vector. In accordance with one or more embodiments, the intermediate user scores vector is normalized and then used as a short-term user cluster membership vector, e.g., $P_t(C|u)$.

The process of FIG. 7 can be implemented by incremental scoring engine 126 in response to a recommendation request. At step 702, a determination is made whether or not the recommendation request identifies a current item. If not, processing continues at step 704 to apply the decay factor to an existing incremental intermediate user's scores vector, and processing ends. If an item is included in the recommendation request, processing continues at step 706 to determine whether or not a scores vector exists. If not, the item's cluster membership vector is used as the scoring vector, which can be normalized as described herein and then used as a short-term user cluster membership vector.

If it is determined, at step 706, that an intermediate scoring vector exists for the user, processing continues at step 710 to update the scoring vector for each cluster. At step 710, a determination is made whether any clusters remain to be processed. If it is determined that all of the clusters identified in the scoring vector have been updated, the scoring vector is normalized and can be used as a short-term user cluster membership vector. If one or more clusters remain to be processed, as determined in step 710, processing continues at step 712 to get the first, or next, cluster's score from the intermediate user's scores vector. At step 714, the item's cluster membership probability is retrieved from the item cluster membership vector of model 110. At step 716, the user's score for the current cluster is updated in the scores vector by applying the decay factor to the user's current score for the cluster and adding the item's cluster membership probability. Processing continues at step 710 to process any remaining clusters in the user's scores vector.

FIG. 8 illustrates some components that can be used in connection with one or more embodiments of the present disclosure. In accordance with one or more embodiments of the present disclosure, one or more computing devices, e.g., one or more servers, user devices 114 or other computing device, 802 are configured to comprise functionality described herein. For example, a computing device 802 can be configured to provide any of the functionality described herein, such as and without limitation, the functionality of any one or more of web page provider/server 102, training data generator 118, model generator 108, trained model scoring engine, 116, incremental scoring engine 126, scoring engine 104, and/or recommendation generator 112 in accordance with one or more of the embodiments disclosed herein. The same or another computing device 1202 can be configured as one or more of the components.

Computing device 802 can serve content to user computers 804 using a browser application via a network 806. Data store 808 can be used to store web pages, content, training data, click logs, trained model(s), and/or program code to configure server 802 to act as a special purpose device providing some or all of the functionality disclosed herein, such as and without limitation the functionality described in connection with the process flows and components shown in the drawings, as well as any functionality described herein.

The user computer 804, and/or user device 114, can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 802 and the user computer 804 can include one or more processors, memory, a removable media reader, network interface, display and interface, and one or more input devices, e.g., keyboard, keypad, mouse, etc. and input device interface, for example. One skilled in the art will recognize that server 802 or user computer 804 can be configured in many different ways and implemented using many different combinations of hardware, software, or firmware.

In accordance with one or more embodiments, a computing device 802 can make a user interface available to a user computer 804 via the network 806. The user interface made available to the user computer 804 can include items, or identifiers (e.g., URLs) of items recommended, such as and without limitations items selected for the user based on scores generated using the incremental scoring data and optionally the trained model in accordance with one or more embodiments of the present invention. In accordance with one or more embodiments, computing device 802 makes a user interface available to a user computer 804 by communicating a definition of the user interface to the user computer 804 via the network 806. The user interface definition can be specified using any of a number of languages, including without limitation a markup language such as Hypertext Markup Language, scripts, applets and the like. The user interface definition can be processed by an application executing on the user computer 804, such as a browser application, to output the user interface on a display coupled, e.g., a display directly or indirectly connected, to the user computer 804.

In an embodiment the network 806 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

It should be apparent that embodiments of the present disclosure can be implemented in a client-server environment such as that shown in FIG. 8. Alternatively, embodiments of the present disclosure can be implemented other environments, e.g., a peer-to-peer environment as one non-limiting example.

FIG. 9 is a detailed block diagram illustrating an internal architecture of a computing device, such as server 802 and/or user computing device 804, in accordance with one or more embodiments of the present disclosure. As shown in FIG. 9, internal architecture 900 includes one or more processing units (also referred to herein as CPUs) 912, which interface with at least one computer bus 902. Also interfacing with computer bus 902 are fixed disk 906, network interface 914, memory 904, e.g., random access memory (RAM), run-time transient memory, read only memory (ROM), etc., media disk drive interface 908 as an interface for a drive that can read and/or write to media including removable media such as floppy, CD-ROM, DVD, etc. media, display interface 910 as interface for a monitor or other display device, keyboard interface 916 as interface for a keyboard, pointing device interface 918 as an interface for a mouse or other pointing device, and miscellaneous other interfaces not shown individually, such as parallel and serial port interfaces, a universal serial bus (USB) interface, and the like.

Memory 904 interfaces with computer bus 902 so as to provide information stored in memory 904 to CPU 912 during execution of software programs such as an operating system, application programs, device drivers, and software modules that comprise program code, and/or computer-executable process steps, incorporating functionality described herein, e.g., one or more of process flows described herein. CPU 912 first loads computer-executable process steps from storage, e.g., memory 904, fixed disk 906, removable media drive, and/or other storage device. CPU 912 can then execute the stored process steps in order to execute the loaded computer-executable process steps. By way of a non-limiting example, stored data, e.g., data stored by a storage device, can be accessed by CPU 912 during the execution of computer-executable process steps.

Persistent storage, e.g., fixed disk 806, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code executable by a computer, in machine readable form. By way of example, and not limitation, a computer readable medium may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
receiving, using at least one processor, an item recommendation request, the request identifying a user;
responsive to a determination made using web page interaction data that the user is a frequent user, using item scoring in a model trained using the web page interaction data for a plurality of users, the item scoring identifying a plurality of scored items and the corresponding scores;
responsive to a determination made using the web page interaction data that the user is an infrequent user, the at least one processor;
identifying, using a current item identified from behavior of the user and the trained model, a probability for each cluster identified in the trained model that the user belongs to the cluster; and
generating the plurality of scored items, each item of the plurality of scored items having an item score determined using the item's cluster score and the probability that the user belongs to the cluster;
selecting, by the at least one processor, items from the plurality of scored items based on the item scoring; and
providing, by the at least one processor, the selected items as item recommendations in response to the request.

2. The method of claim 1, the trained model identifying a plurality of clusters, the plurality of users and a plurality of items, for each cluster, the trained model identifies for each user of the plurality of users a probability that the user belongs to the cluster, and for each cluster, the trained model identifies for each item of the plurality of items a probability that the item belongs to the cluster.

3. The method of claim 1, further comprising:
generating a short-term cluster membership vector using the current item identified from the behavior of the user and the trained model, the short-term membership vector being used to identify the probability for each cluster identified in the trained model that the user belongs to the cluster.

4. The method of claim 3, the behavior of the user is determined using the user's web page interaction data and the trained model is trained using other users' web page interaction data, the method further comprising:
generating an incremental user scoring vector using the current item and an item cluster membership vector for the item in the trained model, the item cluster membership vector identifying the item's cluster score for each cluster identified in the trained model, the item's cluster score comprising a probability that the item belongs to the cluster; and
generating the short-term cluster membership vector using the incremental user scoring vector.

5. The method of claim 4, further comprising:
applying a decay factor to the incremental user scoring vector before generating the short-term cluster membership vector using the incremental user scoring vector.

6. The method of claim 4, generating the plurality of scores further comprising:
determining, for each item of the plurality of scored items, a product for each cluster association of the item, the product being determined using the item's cluster score and the probability that the user belongs to the cluster; and
aggregating the plurality of products.

7. The method of claim 3, the trained model comprising a long-term cluster membership vector, generating a short-term cluster membership vector further comprising:
combining the long-term cluster membership vector with the short-term cluster membership vector to form the short-term cluster membership vector.

8. The method of claim 7, combining the long-term cluster membership vector with the short-term cluster membership vector further comprising:
generating a weighted long-term cluster membership vector by applying a first weight to the long-term cluster membership vector;
generating a weighted short-term cluster membership vector by applying a second weight to the short-term cluster membership vector; and
combining the weighted long-term cluster membership vector with the weighted short-term cluster membership vector to form the short-term cluster membership vector.

9. The method of claim 1, further comprising:
generating, using at least one processor, training data from the web page interaction data identifying user web page interactions for the plurality of users, the training data comprising information to identify each user of the plurality and a plurality of items associated with the web page interactions of the plurality of users;
generating the trained model, using the at least one processor and the generated training data.

10. A system comprising:
at least one computing device comprising one or more processors to execute and memory to store instructions to:
receive an item recommendation request, the request identifying a user;
responsive to a determination made using web page interaction data that the user is a frequent user, use item scoring in a model trained using the web page interaction data for a plurality of users, the item scoring identifying a plurality of scored items and the corresponding scores;
responsive to a determination made using the web page interaction data that the user is an infrequent user;
identify, using a current item identified from behavior of the user and the trained model, a probability for each cluster identified in the trained model that the user belongs to the cluster; and
generate the plurality of scored items, each item of the plurality of scored items having an item score determined using the item's cluster score and the probability that the user belongs to the cluster;
select items from the plurality of scored items based on the item scoring; and
provide the selected items as item recommendations in response to the request.

11. The system of claim 10, the trained model identifying a plurality of clusters, the plurality of users and a plurality of items, for each cluster, the trained model identifies for each user of the plurality of users a probability that the user belongs to the cluster, and for each cluster, the trained model identifies for each item of the plurality of items a probability that the item belongs to the cluster.

12. The system of claim 10, the instructions further comprising instructions to:
generate a short-term cluster membership vector using the current item identified from the behavior of the user and the trained model, the short-term membership vector being used to identify the probability for each cluster identified in the trained model that the user belongs to the cluster.

13. The system of claim 12, the behavior of the user is determined using the user's web page interaction data and the trained model is trained using other users' web page interaction data, the instructions further comprising instructions to:
generate an incremental user scoring vector using the current item and an item cluster membership vector for the item in the trained model, the item cluster membership vector identifying the item's cluster score for each cluster identified in the trained model, the item's cluster score comprising a probability that the item belongs to the cluster; and
generate the short-term cluster membership vector using the incremental user scoring vector.

14. The system of claim 13, the instructions further comprising instructions to:
apply a decay factor to the incremental user scoring vector before generating the short-term cluster membership vector using the incremental user scoring vector.

15. The system of claim 13, the instructions to generate the plurality of scores further comprising instructions to:
determine, for each item of the plurality of scored items, a product for each cluster association of the item, the product being determined using the item's cluster score and the probability that the user belongs to the cluster; and
aggregate the plurality of products.

16. The system of claim 12, the trained model comprising a long-term cluster membership vector, the instructions to generate a short-term cluster membership vector further comprising instructions to:
combine the long-term cluster membership vector with the short-term cluster membership vector to form the short-term cluster membership vector.

17. The system of claim 16, the instructions to combine the long-term cluster membership vector with the short-term cluster membership vector further comprising instructions to:
generate a weighted long-term cluster membership vector by applying a first weight to the long-term cluster membership vector;
generate a weighted short-term cluster membership vector by applying a second weight to the short-term cluster membership vector; and
combine the weighted long-term cluster membership vector with the weighted short-term cluster membership vector to form the short-term cluster membership vector.

18. The system of claim 10, further comprising instructions to:
generate training data from the web page interaction data identifying user web page interactions for the plurality of users, the training data comprising information to identify each user of the plurality and a plurality of items associated with the web page interactions of the plurality of users;

generate the trained model, using the at least one processor and the generated training data.

19. A non-transitory computer-readable medium tangibly storing thereon computer-readable instructions that when executed cause at least one processor to:
receive an item recommendation request, the request identifying a user;
responsive to a determination made using web page interaction data that the user is a frequent user, use item scoring in a model trained using the web page interaction data for a plurality of users, the item scoring identifying a plurality of scored items and the corresponding scores;
responsive to a determination made using the web page interaction data that the user is an infrequent user;
identify, using a current item identified from behavior of the user and the trained model, a probability for each cluster identified in the trained model that the user belongs to the cluster; and
generate the plurality of scored items, each item of the plurality of scored items having an item score determined using the item's cluster score and the probability that the user belongs to the cluster;
select items from the plurality of scored items based on the item scoring; and
provide the selected items as item recommendations in response to the request.

20. The non-transitory computer-readable medium of claim 19, the trained model identifying a plurality of clusters, the plurality of users and a plurality of items, for each cluster, the trained model identifies for each user of the plurality of users a probability that the user belongs to the cluster, and for each cluster, the trained model identifies for each item of the plurality of items a probability that the item belongs to the cluster.

21. The non-transitory computer-readable medium of claim 19, the instructions further comprising instructions to:
generate a short-term cluster membership vector using the current item identified from the behavior of the user and the trained model, the short-term membership vector being used to identify the probability for each cluster identified in the trained model that the user belongs to the cluster.

22. The non-transitory computer-readable medium of claim 21, the behavior of the user is determined using the user's web page interaction data and the trained model is trained using other users' web page interaction data, the instructions further comprising instructions to:
generate an incremental user scoring vector using the current item and an item cluster membership vector for the item in the trained model, the item cluster membership vector identifying the item's cluster score for each cluster identified in the trained model, the item's cluster score comprising a probability that the item belongs to the cluster; and
generate the short-term cluster membership vector using the incremental user scoring vector.

23. The non-transitory computer-readable medium of claim 22, the instructions further comprising instructions to:
apply a decay factor to the incremental user scoring vector before generating the short-term cluster membership vector using the incremental user scoring vector.

24. The non-transitory computer-readable medium of claim 22, the instructions to generate the plurality of scores further comprising instructions to:
determine, for each item of the plurality of scored items, a product for each cluster association of the item, the product being determined using the item's cluster score and the probability that the user belongs to the cluster; and
aggregate the plurality of products.

25. The non-transitory computer-readable medium of claim 21, the trained model comprising a long-term cluster membership vector, the instructions to generate a short-term cluster membership vector further comprising instructions to:
combine the long-term cluster membership vector with the short-term cluster membership vector to form the short-term cluster membership vector.

26. The non-transitory computer-readable medium of claim 25, the instructions to combine the long-term cluster membership vector with the short-term cluster membership vector further comprising instructions to:
generate a weighted long-term cluster membership vector by applying a first weight to the long-term cluster membership vector;
generate a weighted short-term cluster membership vector by applying a second weight to the short-term cluster membership vector; and
combine the weighted long-term cluster membership vector with the weighted short-term cluster membership vector to form the short-term cluster membership vector.

27. The non-transitory computer-readable medium of claim 19, further comprising instructions to:
generate training data from the web page interaction data identifying user web page interactions for the plurality of users, the training data comprising information to identify each user of the plurality and a plurality of items associated with the web page interactions of the plurality of users;
generate the trained model, using the at least one processor and the generated training data.

* * * * *